United States Patent
Ennacer et al.

(10) Patent No.: US 10,301,966 B2
(45) Date of Patent: May 28, 2019

(54) TURBINE AIRFOIL PLATFORM SEGMENT WITH FILM COOLING HOLE ARRANGEMENT

(71) Applicant: United Technologies Corporation, Hartford, CT (US)

(72) Inventors: Mohammed Ennacer, St. Hubert (CA); Russell J. Bergman, Windsor, CT (US); Jason B. Moran, Wilbraham, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 616 days.

(21) Appl. No.: 14/957,731

(22) Filed: Dec. 3, 2015

(65) Prior Publication Data

US 2016/0160656 A1      Jun. 9, 2016

Related U.S. Application Data

(60) Provisional application No. 62/088,916, filed on Dec. 8, 2014.

(51) Int. Cl.
*F01D 9/04* (2006.01)
*F01D 25/12* (2006.01)
(Continued)

(52) U.S. Cl.
CPC ............. *F01D 25/12* (2013.01); *F01D 9/041* (2013.01); *F01D 5/186* (2013.01); *F01D 9/065* (2013.01);
(Continued)

(58) Field of Classification Search
CPC .......... F01D 25/12; F01D 5/186; F01D 9/041; F01D 9/065; F01D 5/187; F05B 2240/801; F05B 2260/20; F05B 2260/22
See application file for complete search history.

(56) References Cited

U.S. PATENT DOCUMENTS 5,370,499 A    12/1994  Lee
5,418,345 A     5/1995  Adamski
(Continued)

OTHER PUBLICATIONS

U.S. Appl. No. 13/539,838, filed Jul. 2, 2012.
(Continued)

*Primary Examiner* — Todd E Manahan
*Assistant Examiner* — Eric W Linderman
(74) *Attorney, Agent, or Firm* — Carlson, Gaskey & Old, P.C.

(57) ABSTRACT

A turbine airfoil segment includes inner and outer platforms that are joined by at least one airfoil. The airfoil includes leading and trailing edges that are joined by spaced apart first and second sides to provide an exterior airfoil surface. At least one of the inner and outer platforms includes film cooling holes that have external breakout points that are located in substantial conformance with the Cartesian coordinates set forth in Table 1 for the inner platform or Table 2 for the outer platform. The Cartesian coordinates are provided by an axial coordinate, a circumferential coordinate, and a radial coordinate, relative to a zero-coordinate. The film cooling holes have a diametrical surface tolerance relative to the specified coordinates of 0.20 inches (5.0 mm).

8 Claims, 2 Drawing Sheets

(51) Int. Cl.
*F01D 9/06* (2006.01)
*F01D 5/18* (2006.01)

(52) U.S. Cl.
CPC .... *F05B 2240/801* (2013.01); *F05D 2240/12* (2013.01); *F05D 2240/81* (2013.01); *F05D 2250/74* (2013.01); *F05D 2260/202* (2013.01); *Y02T 50/672* (2013.01); *Y02T 50/673* (2013.01); *Y02T 50/676* (2013.01)

(56) References Cited

U.S. PATENT DOCUMENTS

| | | | |
|---|---|---|---|
| 6,554,572 B2 | 4/2003 | Rinck et al. | |
| 7,086,829 B2 | 8/2006 | Fuller et al. | |
| 7,712,316 B2 | 5/2010 | Spangler | |
| 8,707,712 B2 | 4/2014 | Spangler et al. | |
| 9,803,488 B2* | 10/2017 | Riley | F01D 9/041 |
| 2013/0164116 A1* | 6/2013 | Tardif | F01D 9/041 |
| | | | 415/115 |
| 2013/0189110 A1* | 7/2013 | Batt | F01D 9/041 |
| | | | 416/219 R |
| 2013/0206739 A1* | 8/2013 | Reed | F01D 25/12 |
| | | | 219/121.71 |
| 2014/0000287 A1* | 1/2014 | Spangler | F01D 25/12 |
| | | | 60/806 |
| 2015/0211376 A1* | 7/2015 | Riley | F01D 9/041 |
| | | | 415/115 |
| 2016/0160654 A1* | 6/2016 | Ennacer | F01D 9/041 |
| | | | 60/806 |
| 2016/0201473 A1* | 7/2016 | Spangler | F01D 5/186 |
| | | | 60/806 |
| 2016/0245093 A1* | 8/2016 | Deibel | F01D 9/041 |
| 2017/0198599 A1* | 7/2017 | Ryan | F01D 11/08 |
| 2018/0106156 A1* | 4/2018 | LoRicco | F01D 9/065 |
| 2018/0163551 A1* | 6/2018 | Forbes | F01D 9/065 |

OTHER PUBLICATIONS

U.S. Appl. No. 13/539,917, filed Jul. 2, 2012.
U.S. Appl. No. 13/539,873, filed Jul. 2, 2012.
U.S. Appl. No. 13/585,982, filed Aug. 15, 2012.

* cited by examiner

TURBINE AIRFOIL PLATFORM SEGMENT WITH FILM COOLING HOLE ARRANGEMENT

CROSS-REFERENCE TO RELATED APPLICATION

The present disclosure claims priority to U.S. Provisional Patent Application No. 62/088,916, filed Dec. 8, 2014.

BACKGROUND

This disclosure relates to a gas turbine engine and, more particularly, to a turbine airfoil segment that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow for the next set of blades. The turbine vanes can be provided in arc segments that each include one or more airfoils that radially extend between inner and outer platforms or endwalls. Blades and vanes are generally referred to as "airfoils."

Turbine vanes and blades can include film cooling features to provide a boundary layer of cooling fluid along external surfaces, which protects the airfoil from the hot combustion gases in the core flow path. Non-linear flow analyses and complex strain modeling are required to achieve good cooling, making practical results difficult to predict. Loading and temperature considerations also impose substantial design limitations, which cannot easily be generalized from one system to another.

SUMMARY

A turbine airfoil segment according to an example of the present disclosure includes inner and outer platforms that are joined by at least one airfoil. The airfoil includes leading and trailing edges that are joined by spaced apart first and second sides to provide an exterior airfoil surface, and at least one of the inner and outer platforms includes film cooling holes that have external breakout points that are located in substantial conformance with the Cartesian coordinates set forth in Table 1 for the inner platform or Table 2 for the outer platform. The Cartesian coordinates provided by an axial coordinate, a circumferential coordinate, and a radial coordinate, relative to a zero-coordinate, and the film cooling holes have a diametrical surface tolerance relative to the specified coordinates of 0.20 inches (5.0 mm).

In a further embodiment of any of the foregoing embodiments, the external breakout points of the film cooling holes of the outer platform are located in substantial conformance with the Cartesian coordinates set forth in Table 1 and the external breakout points of the film cooling holes of the inner platform are located in substantial conformance with the Cartesian coordinates set forth in Table 2.

In a further embodiment of any of the foregoing embodiments, the film cooling holes are conical holes.

In a further embodiment of any of the foregoing embodiments, spacing between edges of adjacent cooling holes is at least 0.015 inch (0.38 mm).

In a further embodiment of any of the foregoing embodiments, the film cooling holes have a diameter of 0.010-0.035 inch (0.25-0.89 mm).

A gas turbine engine according to an example of the present disclosure includes a compressor section, a combustor fluidly connected to the compressor section, and a turbine section fluidly connected to the combustor. The turbine section includes an array of turbine airfoil segments, each turbine airfoil segment including inner and outer platforms that are joined by at least one airfoil. The airfoil includes leading and trailing edges that are joined by spaced apart first and second sides to provide an exterior airfoil surface, and at least one of the inner and outer platforms includes film cooling holes that have external breakout points that are located in substantial conformance with the Cartesian coordinates set forth in Table 1 for the inner platform or Table 2 for the outer platform. The Cartesian coordinates provided by an axial coordinate, a circumferential coordinate, and a radial coordinate, relative to a zero-coordinate, and the film cooling holes have a diametrical surface tolerance relative to the specified coordinates of 0.20 inches (5.0 mm).

In a further embodiment of any of the foregoing embodiments, the external breakout points of the film cooling holes of the outer platform are located in substantial conformance with the Cartesian coordinates set forth in Table 1 and the external breakout points of the film cooling holes of the inner platform are located in substantial conformance with the Cartesian coordinates set forth in Table 2.

In a further embodiment of any of the foregoing embodiments, the film cooling holes are conical holes.

In a further embodiment of any of the foregoing embodiments, spacing between edges of adjacent cooling holes is at least 0.015 inch (0.38 mm).

In a further embodiment of any of the foregoing embodiments, the film cooling holes have a diameter of 0.010-0.035 inch (0.25-0.89 mm).

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
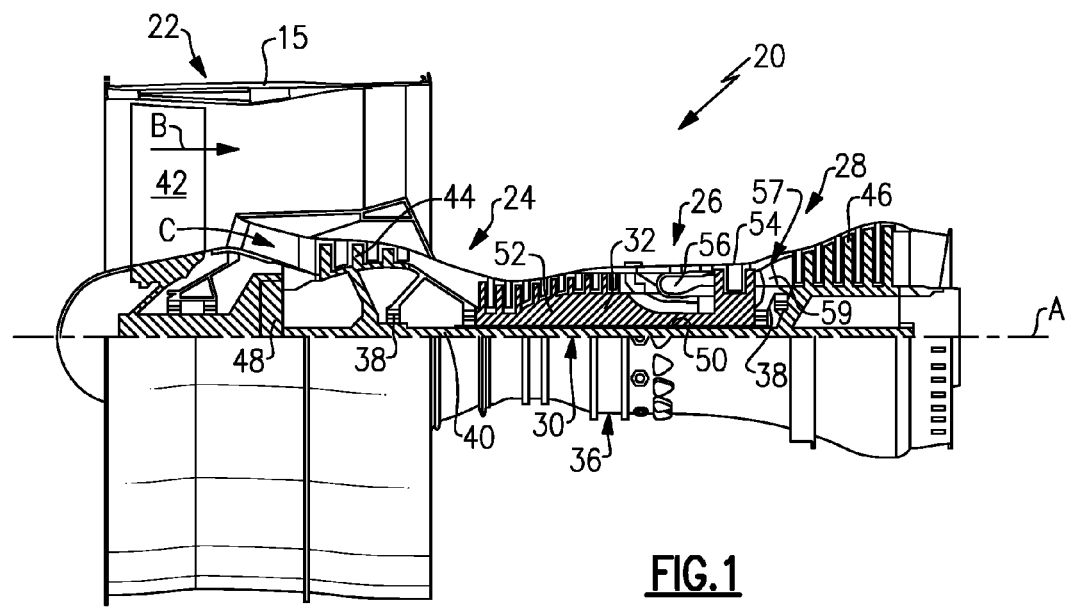
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
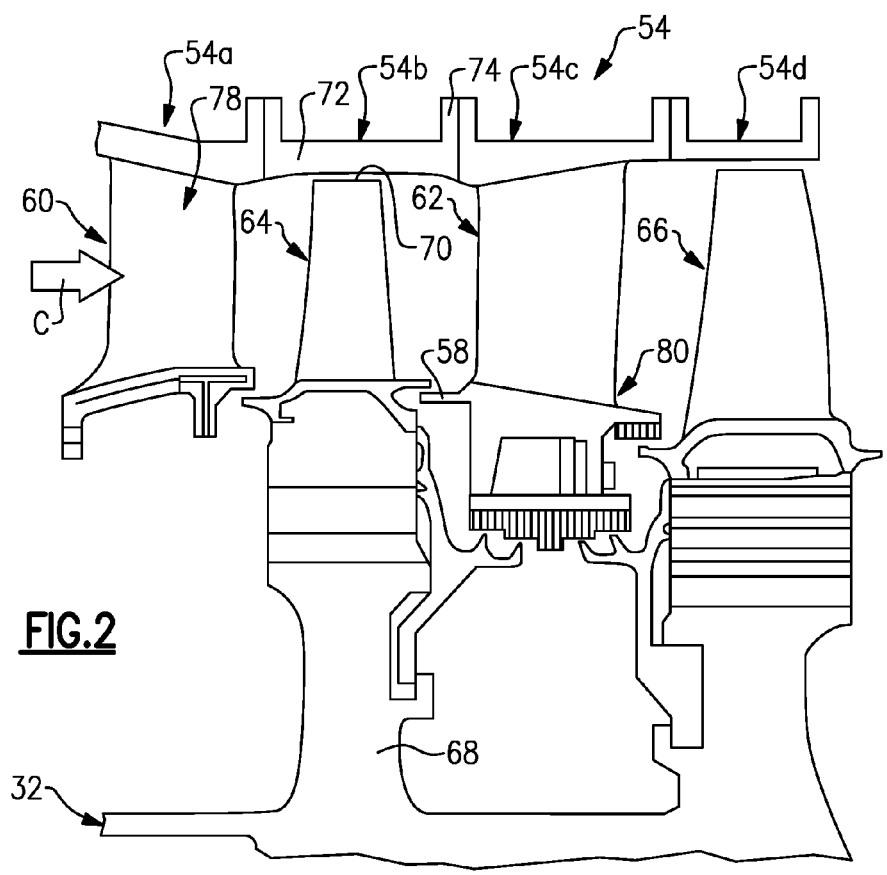
FIG. 2 illustrates selected portions of a high pressure turbine of the gas turbine engine.

FIG. 2 illustrates a cross-sectional view of a portion of the high pressure turbine section 54. The high pressure turbine section 54 includes first and second arrays 54a, 54c of circumferentially spaced fixed vanes 60, 62. The arrays 54a, 54c are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62. A platform 58 of the second fixed vane array 62 is arranged in an overlapping relationship with the turbine blades 64, 66.

The turbine blades 64, 66 each include a free tip end 70 adjacent to a blade outer air seal 72 of a case structure 74. The first and second stage arrays 54a, 54c of turbine vanes and first and second stage arrays 54b, 54d of turbine blades are arranged within the core flow path C and are operatively connected to the high speed spool 32. The second stage arrays 54c of turbine vanes includes a plurality of turbine airfoil segments 80. Each segment 80 provides an arc length such that the segments 80 together provide a complete ring around the engine central longitudinal axis A.

Figure 3:
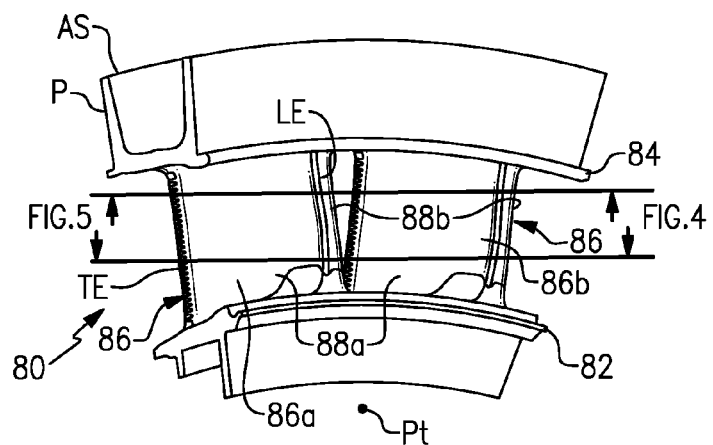
FIG. 3 illustrates an isolated view of a representative segment of the high pressure turbine.

FIG. 3 shows an isolated view of a representative one of the segments 80. The segment 80 includes inner and outer platforms 82, 84 that are joined by at least one airfoil 86. In this example, the segment 80 is a vane "doublet" and includes two such airfoils 86, namely first airfoil 86a and second airfoil 86b. Each airfoil 86 includes leading and trailing edges (represented at "LE" and "TE") that are joined by spaced apart first and second sides 88a, 88b to provide an exterior airfoil surface. Sometimes the first and second sides 88a, 88b are referred to as pressure and suction sides.

Each segment 80 can be formed of a high strength, heat resistant material, such as but not limited to a nickel-based or cobalt-based superalloy, or a high temperature, stress-resistant ceramic or ceramic composite material. In cooled configurations, internal fluid passages and external cooling apertures provide for a combination of convection and film cooling. In addition, one or more thermal barrier coatings, abrasion-resistant coatings or other protective coatings may be applied to the segments 80, or at least portions thereof.

Figure 4:
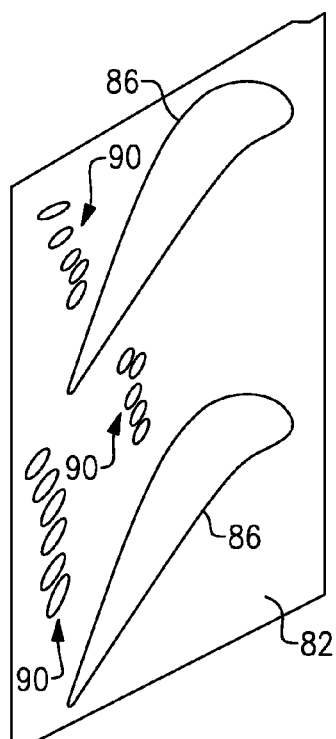
FIG. 4 illustrates the gas-path surface of the inner platform of the segment of FIG. 3.
Figure 5:
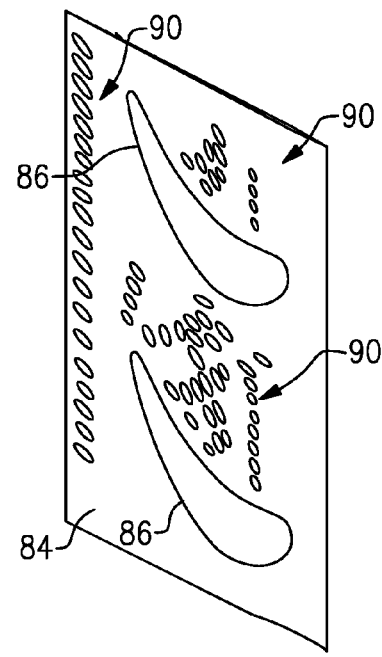
FIG. 5 illustrates the gas-path surface of the outer platform of the segment of FIG. 3.

FIG. 4 shows the gas-path surface of the inner platform 82 and FIG. 5 shows of the gas-path surface of the outer platform 84. Each platform 82 and 84 includes film cooling holes, generally represented at 90, that have external breakout points that are located in substantial conformance with the Cartesian coordinates set forth in one of Table 1 below for the inner platform 82 or Table 2 below for the outer platform 84. Thus, although the segment 80 in this example has the inner platform 82 with film cooling holes 90 according to Table 1 and the outer platform 84 with film cooling holes 90 according to Table 2, the segment 80 in further examples could include either the inner platform 82 with film cooling holes 90 according to Table 1 or the outer platform 84 with film cooling holes 90 according to Table 2 such that one or the other of the inner and outer platforms 82, 84 does not have the designated hole arrangement.

The Cartesian coordinates are provided by an axial coordinate (X-coordinate), a circumferential coordinate (Y-coordinate), and a radial coordinate (Z-coordinate), relative to a zero-coordinate. The axial coordinate is along a direction parallel to the engine axis A. The radial coordinate is along a direction perpendicular to the engine axis A, and the circumferential coordinate is along a circumferential direction about the engine axis A. In one example, the zero-coordinate is at point "Pt" located with respect to the curvature of the arc of the segment 80. In one example, the point "Pt" is located at the centerpoint of the curvature of arc surface AS and on a plane coincident with surface P.

The coordinates of Tables 1 and 2 (in inches) provide the nominal axial, circumferential, and radial coordinates relative to the zero-coordinate, on a cold, uncoated, stationary segment 80. Each row in Tables 1 and 2 corresponds to a single film cooling hole 90 location. Additional elements, such as additional cooling holes, protective coatings, fillets and seal structures may also be formed onto the external surfaces of the airfoils 86, but these elements are not necessarily described by the coordinates.

Due to manufacturing tolerances, the film cooling holes 90 have a diametrical surface tolerance, relative to the specified coordinates, of 0.20 inches (5.0 mm). That is, there is a spatial envelope in which the film cooling hole 90 is located. In a further example, a minimum spacing is provided between adjacent film cooling holes 90. In one example, the minimum spacing between edges of adjacent film cooling holes 90 is at least 0.015 inch (0.38 mm).

The film cooling holes 90 are arranged to produce film of cooling fluid on the external surfaces of the platforms 82, 84. As shown, portions of the film cooling holes 90 are arranged in clusters or rows to provide film cooling at particular locations. In Tables 1 and 2, each film cooling hole has a Row ID and a hole number. The Row ID nomenclature has three letters. The first two letters designate a row and the last letter designates the hole of that row (e.g., holes A through F in cluster RB). Table 2 uses a similar nomenclature.

In a further example, the film cooling holes 90, or clusters of holes, are diffusing/conical holes, for example, but are not limited to such geometries. In diffusing hole geometries, the hole diameter area increases as the hole opens to the external surface. In contrast, cylindrical holes would have a uniform diameter area along the length of the hole.

Diffusing holes can provide good film coverage in comparison with a cylindrical hole of the same size. Diffusing holes can be used where enhanced cooling is desired. Cylindrical holes would provide higher velocity cooling flow in comparison to conical holes of the same size. In one further example, the film cooling holes 90 have a minimum diameter of 0.010-0.035 inch (0.25-0.89 mm)

TABLE 1

Inner Platform

| P&W ID | Patent ID | X | Y | Z |
|---|---|---|---|---|
| RAA | 1 | −0.403 | −0.964 | 7.596 |
| RAB | 2 | −0.427 | −0.799 | 7.620 |
| RAC | 3 | −0.475 | −0.657 | 7.642 |
| RAD | 4 | −0.525 | −0.587 | 7.643 |
| RAE | 5 | −0.515 | −0.446 | 7.648 |
| RBA | 6 | −0.275 | 0.606 | 7.631 |
| RBB | 7 | −0.337 | 0.734 | 7.623 |
| RBC | 8 | −0.389 | 0.858 | 7.608 |
| RBD | 9 | −0.394 | 1.038 | 7.587 |
| RBE | 10 | −0.384 | 1.260 | 7.555 |
| RBF | 11 | −0.418 | 1.407 | 7.528 |
| RCA | 12 | −0.816 | −0.026 | 7.702 |
| RCB | 13 | −0.887 | 0.008 | 7.725 |
| RCC | 14 | −0.865 | 0.192 | 7.735 |
| RCD | 15 | −0.895 | 0.304 | 7.734 |
| RCE | 16 | −0.918 | 0.414 | 7.722 |

TABLE 2

Outer Platform

| Row ID | Hole ID | X | Y | Z |
|---|---|---|---|---|
| TAA | 1 | −0.071 | −0.988 | 9.679 |
| TAB | 2 | −0.073 | −0.796 | 9.697 |
| TAC | 3 | −0.072 | −0.602 | 9.710 |
| TAD | 4 | −0.074 | −0.414 | 9.720 |
| TAE | 5 | −0.072 | −0.219 | 9.727 |
| TAF | 6 | −0.070 | 0.031 | 9.729 |
| TBA | 7 | −0.068 | 0.272 | 9.725 |
| TBB | 8 | −0.068 | 0.496 | 9.716 |
| TBC | 9 | −0.069 | 0.720 | 9.702 |
| TBD | 10 | −0.070 | 0.942 | 9.683 |
| TBE | 11 | −0.071 | 1.163 | 9.659 |
| TCA | 12 | −0.065 | 1.355 | 9.634 |
| TCB | 13 | −0.067 | 1.516 | 9.610 |
| TCC | 14 | −0.072 | 1.661 | 9.586 |
| TCD | 15 | −0.073 | 1.795 | 9.562 |
| TCE | 16 | −0.074 | 1.949 | 9.532 |
| TCF | 17 | −0.073 | 2.118 | 9.496 |
| TCG | 18 | −0.073 | 2.303 | 9.453 |
| TCH | 19 | −0.073 | 2.482 | 9.407 |
| TCJ | 20 | −0.073 | 2.666 | 9.357 |
| TDA | 21 | −0.436 | 0.247 | 9.681 |
| TDB | 22 | −0.466 | 0.390 | 9.679 |
| TDC | 23 | −0.503 | 0.521 | 9.683 |
| TDD | 24 | −0.538 | 0.778 | 9.691 |
| TEA | 25 | −0.634 | 0.061 | 9.669 |
| TEB | 26 | −0.777 | 0.071 | 9.676 |

TABLE 2-continued

Outer Platform

| Row ID | Hole ID | X | Y | Z |
|---|---|---|---|---|
| TEC | 27 | −0.897 | 0.005 | 9.666 |
| TFA | 28 | −1.073 | −0.145 | 9.665 |
| TFB | 29 | −1.153 | −0.060 | 9.671 |
| TGA | 30 | −1.245 | −0.015 | 9.670 |
| TGB | 31 | −1.347 | 0.080 | 9.665 |
| TGC | 32 | −1.431 | 0.250 | 9.625 |
| THA | 33 | −0.848 | −0.426 | 9.666 |
| THB | 34 | −0.971 | −0.458 | 9.678 |
| THC | 35 | −1.071 | −0.431 | 9.668 |
| THD | 36 | −1.150 | −0.389 | 9.662 |
| THE | 37 | −1.262 | −0.350 | 9.651 |
| THF | 38 | −1.304 | −0.250 | 9.653 |
| TJA | 39 | −1.023 | −0.700 | 9.669 |
| TJB | 40 | −1.184 | −0.667 | 9.663 |
| TJC | 41 | −1.273 | −0.643 | 9.640 |
| TKA | 42 | −1.170 | −0.937 | 9.637 |
| TKB | 43 | −1.254 | −0.906 | 9.642 |
| TKC | 44 | −1.319 | −0.847 | 9.618 |
| TLA | 45 | −1.582 | −1.251 | 9.448 |
| TLB | 46 | −1.574 | −1.098 | 9.463 |
| TLC | 47 | −1.566 | −0.937 | 9.474 |
| TLD | 48 | −1.559 | −0.786 | 9.486 |
| TLE | 49 | −1.563 | −0.649 | 9.503 |
| TLF | 50 | −1.536 | −0.487 | 9.552 |
| TLG | 51 | −1.528 | −0.366 | 9.592 |
| TLH | 52 | −1.543 | −0.238 | 9.628 |
| TLJ | 53 | −1.677 | −0.152 | 9.622 |
| TMA | 54 | −0.995 | 1.653 | 9.547 |
| TMB | 55 | −1.109 | 1.627 | 9.565 |
| TMC | 56 | −1.180 | 1.731 | 9.525 |
| TMD | 57 | −1.278 | 1.857 | 9.473 |
| TNA | 58 | −1.161 | 1.420 | 9.582 |
| TNB | 59 | −1.238 | 1.459 | 9.579 |
| TNC | 60 | −1.284 | 1.528 | 9.546 |
| TND | 61 | −1.288 | 1.683 | 9.508 |
| TPA | 62 | −1.581 | 1.098 | 9.466 |
| TPB | 63 | −1.572 | 1.258 | 9.441 |
| TPC | 64 | −1.564 | 1.397 | 9.416 |
| TPD | 65 | −1.563 | 1.544 | 9.392 |

Substantial conformance with the coordinates of Tables 1, 2, or both is based on points representing the film cooling hole 90 locations, for example in inches or millimeters, as determined by selecting particular values of scaling parameters. A substantially conforming segment has film cooling holes that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified vane, or that the part or structure is sufficiently the same with respect to a part design in a type-certified or type-certificated vane, such that the part or structure complies with airworthiness standards applicable to the specified vane. In particular, substantial conformance encompasses any regulatory determination that a particular part or structure is sufficiently similar to, identical to, or the same as a specified vane, such that certification or authorization for use is based at least in part on the determination of similarity.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine airfoil segment comprising:
    inner and outer platforms that are joined by at least one airfoil to form a segment that has an arc, the at least one airfoil includes leading and trailing edges that are joined by spaced apart first and second sides to provide an exterior airfoil surface, and at least one of the inner and outer platforms includes film cooling holes that have external breakout points that are located in the Cartesian coordinates set forth in Table 1 for the inner platform or Table 2 for the outer platform, the Cartesian coordinates provided by an axial coordinate, a circumferential coordinate, and a radial coordinate, relative to a zero-coordinate, wherein the zero-coordinate is at point, Pt, located with respect to the curvature of the arc of the segment, and the film cooling holes have a diametrical surface tolerance relative to the specified coordinates of 0.20 inches (5.0 mm).

2. The turbine airfoil segment as recited in claim 1, wherein the external breakout points of the film cooling holes of the outer platform are located in the Cartesian coordinates set forth in Table 1 and the external breakout points of the film cooling holes of the inner platform are located in the Cartesian coordinates set forth in Table 2.

3. The turbine airfoil segment as recited in claim 2, wherein the film cooling holes are conical holes.

4. The turbine airfoil segment as recited in claim 1, wherein the film cooling holes have a diameter of 0.010-0.035 inch (0.25-0.89 mm).

5. A gas turbine engine comprising:
    a compressor section;
    a combustor fluidly connected to the compressor section;
    a turbine section fluidly connected to the combustor, the turbine section includes an array of turbine airfoil segments, each turbine airfoil segment comprising:
        inner and outer platforms that are joined by at least one airfoil to form a segment that has an arc, the at least one airfoil includes leading and trailing edges that are joined by spaced apart first and second sides to provide an exterior airfoil surface, and at least one of the inner and outer platforms includes film cooling holes that have external breakout points that are located in substantial conformance with the Cartesian coordinates set forth in Table 1 for the inner platform or Table 2 for the outer platform, the Cartesian coordinates provided by an axial coordinate, a circumferential coordinate, and a radial coordinate, relative to a zero-coordinate, wherein the zero-coordinate is at point, Pt, located with respect to the curvature of the arc of the segment, and the film cooling holes have a diametrical surface tolerance relative to the specified coordinates of 0.20 inches (5.0 mm).

6. The gas turbine engine as recited in claim 5, wherein the external breakout points of the film cooling holes of the outer platform are located in the Cartesian coordinates set forth in Table 1 and the external breakout points of the film cooling holes of the inner platform are located in the Cartesian coordinates set forth in Table 2.

7. The gas turbine engine as recited in claim 6, wherein the film cooling holes are conical holes.

8. The gas turbine engine as recited in claim 5, wherein the film cooling holes have a diameter of 0.010-0.035 inch (0.25-0.89 mm).

* * * * *